United States Patent [19]
Mimura

[11] Patent Number: 5,375,031
[45] Date of Patent: Dec. 20, 1994

[54] VEHICLE ELECTROMAGNETIC CLUTCH CONTROL DEVICE

[75] Inventor: Munehiko Mimura, Hyogo, Japan

[73] Assignee: Mitsubishi Denki Kabushiki Kaisha, Tokyo, Japan

[21] Appl. No.: 895,849

[22] Filed: Jun. 9, 1992

[30] Foreign Application Priority Data

Jun. 10, 1991 [JP] Japan .................. 3-137452

[51] Int. Cl.$^5$ .............................................. G05F 1/56
[52] U.S. Cl. ............................. 361/152; 361/154; 361/189
[58] Field of Search ............... 341/152; 361/143, 152, 361/160, 170, 189, 206, 154

[56] References Cited

U.S. PATENT DOCUMENTS

| | | | |
|---|---|---|---|
| 4,777,409 | 10/1988 | Tracy et al. | 315/200 R |
| 4,788,485 | 11/1988 | Kawagishi et al. | 318/811 |
| 4,854,920 | 8/1989 | Mimura . | |
| 5,043,729 | 8/1991 | Fujimoto | 341/152 |
| 5,089,804 | 2/1992 | Mimura | 340/453 |
| 5,094,333 | 3/1992 | Mimura | 192/84 R |
| 5,202,813 | 4/1993 | Vota | 361/154 |

FOREIGN PATENT DOCUMENTS

| | | | |
|---|---|---|---|
| 62-31533 | 2/1987 | Japan . | |
| 0214224 | 8/1990 | Japan | 341/152 |

OTHER PUBLICATIONS

Microprocessor systems handbook, D. P. Burton and A. S. Dexter, published by Analog Devices, 1977, pp. 140–141.

*Primary Examiner*—Jeffrey A. Gaffin
*Attorney, Agent, or Firm*—Sughrue, Mion, Zinn, Macpeak & Seas

[57] ABSTRACT

In a vehicle electromagnetic clutch control device, a PWM modulator is provided in a microcomputer. In the microcomputer, a PWM modulation signal is calculated according to travel control data and engine control data and is then outputted. The PWM modulation signal is buffered by a digital signal buffer, the output of which is passed through a PWM smoothing filter to remove high frequency components of the signal. The output of the PWM smoothing filter is input to an analog buffer amplifier to output a substantially DC current instruction signal to a PWM comparator.

4 Claims, 3 Drawing Sheets

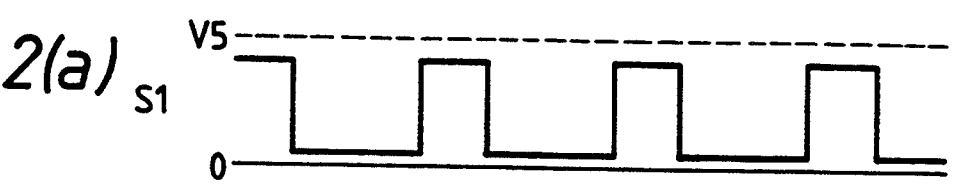
FIG. 2(a) S1
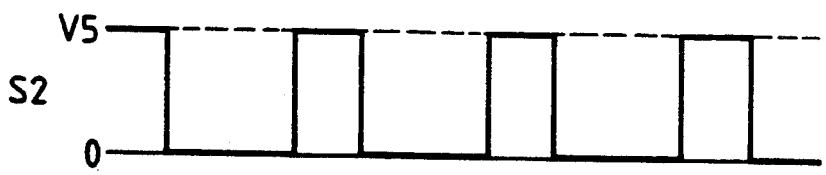
FIG. 2(b) S2
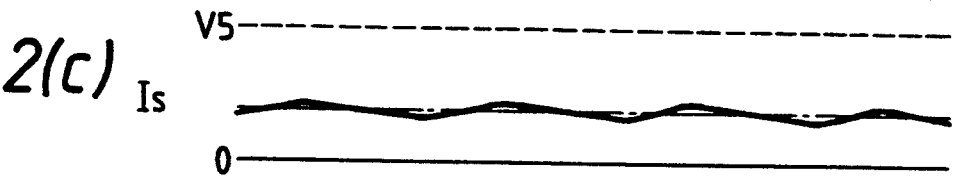
FIG. 2(c) Is

VEHICLE ELECTROMAGNETIC CLUTCH CONTROL DEVICE

BACKGROUND OF THE INVENTION

1. Field of the Invention

This invention relates to a vehicle electromagnetic clutch control device which can be miniaturized with its mounting substrate miniaturized.

2. Description of the Prior Art

A vehicle electromagnetic clutch control device of this type has been disclosed by Japanese Patent Application (OPI) No. 31533/1987 (the term "OPI" as used herein means an "unexamined published application"). FIG. 3 is a circuit diagram showing the arrangement of the conventional vehicle electromagnetic clutch control device.

In FIG. 3, reference numeral 101 designates a microcomputer for providing a clutch current instruction signal $I_S'$ according to an engine control data $S_E$ and travel control data $S_D$; and 800, a D/A (digital-to-analog) converter for converting a digital signal outputted by the microcomputer 101 into an analog signal to obtain an analog current instruction signal $I_S$.

The current applied to an electromagnetic clutch 502 is controlled according to the analog current instruction signal provided by the D/A converter 800, thereby to control the torque transmitted through the clutch.

The microcomputer 101 outputs a plurality of digital signals, which are applied to digital signal buffers 803 through 808 in the D/A converter 800, where they are weighted, respectively. The output signals of those digital signal buffers are applied to a D/A conversion resistor circuit 802, where they are converted into analog signals.

The digital signal buffer amplifiers 803 through 808 are employed to cause the logical output voltage of the microcomputer to reach the ideal logical output voltage as much as possible, because it is difficult to obtain the supply voltage when the logical output voltage of the microcomputer 101 is at "H" level, and it is also difficult to obtain the ground voltage when it is at "L" level. The digital signal buffer amplifiers 803 through 808 are such that internal voltage drop is ranged from 50 mV to 100 mV.

The output of the D/A conversion resistor circuit 802 is applied to the positive (+) input terminal of an analog buffer amplifier 801, the negative (−) input terminal of which is connected to the output terminal thereof.

The current instruction signal $I_S$ provided at the output terminal of the analog buffer amplifier 801 is applied to the positive (+) of a PWM (pulse width modulation) comparator, to the negative (−) of which a current feedback signal $I_F$ provided at the output terminal of a current detecting amplifier 301 is applied.

The PWM comparator 201 subjects the current instruction signal $I_S$ and the current feedback signal $I_F$ to comparison, and outputs an on/off signal for a PWM control output transistor 406 according to the difference between those signals.

The output of the PWM comparator 201 is used to turn on and off a signal converting transistor 403. The base of the signal converting transistor 403 is grounded through a resistor 402 and connected through resistors 401 and 202 to the power source. The emitter of the transistor 403 is grounded, and the collector thereof is connected through resistors 404 and 405 to the power source.

The connecting point of the resistors 404 and 405 is connected to the base of the PWM control output transistor 406. The emitter of the transistor 406 is connected to the power source, and the collector thereof is grounded through a circulation diode 501, and connected to an output terminal 503.

The aforementioned electromagnetic clutch 502 is connected between the output terminal 503 and another output terminal 504. The electromagnetic clutch 502 comprises a clutch coil 502a, and slip rings 502b and 502c.

The output terminal 504 is connected to the collector of a quick-break transistor 601. A constant voltage diode 602 is connected between the collector and the base of the transistor 601, the emitter of which is grounded through a output current detecting resistor 701.

One of the terminals of the output current detecting resistor 701 is connected through a resistor 302 to the positive (+) input terminal of the current detecting amplifier 301, and the other terminal of the output current detecting resistor 701 is connected through a resistor 303 to the negative (−) input terminal of the current detecting amplifier 301. The negative (−) input terminal of the amplifier 301 is connected through a resistor 304 to the output terminal thereof. The above-described current feedback signal $I_F$ is provided at the output terminal of the current detecting amplifier 301.

The microcomputer 101 outputs a clutch release signal, which is applied through a resistor 609 to the base of a signal converting transistor 607. The base of the transistor 607 is grounded through a resistor 608, and the collector thereof is connected through a series circuit of resistors 605 and 606 to the power source.

The connecting point of the resistors 605 and 606 is connected to the base of a signal converting transistor 604. The emitter of the transistor 604 is connected to the power source, and the collector thereof is connected through a resistor 603 to the base of the aforementioned quick-break transistor 601.

The operation of the vehicle electromagnetic clutch control device thus organized will be described. As was described above, the microcomputer 101 provides a clutch current instruction signal according to engine control data $S_E$ and the travel control data $S_D$, and outputs a digital current instruction signal.

The digital current instruction signal is applied to the D/A converter 800, where it is converted into an analog current instruction signal $I_S$. The analog current instruction signal $I_S$ is applied to the PWM comparator 201, where it is compared with the current feedback signal $I_F$ outputted by the current detecting amplifier 301 and the difference signal is subjected to pulse with modulation, so that the signal converting transistor 403 is turned on and off according to the pulse width of the resultant signal.

As the signal converting transistor 403 is turned on and off in this manner, the PWM control output transistor 406 is also turned on and off, to control the flow of a clutch current $I_C$ to the electromagnetic clutch 502; that is, the clutch current is allowed to flow into the clutch or not.

On the other hand, the quick-break transistor 601 is controlled by the clutch release signal outputted by the microcomputer 101 so that it is turned on for the normal connection of the clutch. That is, the signal converting transistors 607 and 604 are turned on by the clutch release signal, and therefore the quick-break transistor 601 is also turned on. Hence, when the PWM control output transistor 406 is turned on by the difference signal pulse-width-modulated by the PWM comparator 201, the clutch current is allowed to flow from the power source into a closed circuit of the PWM control output transistor 406, the output terminal 503, the electromagnetic clutch 502, the output terminal 504, the quick-break transistor 601, the current detecting resistor 701, and the ground.

A voltage drop is developed across the current detecting resistor 701 according to the clutch current $I_C$. The potentials at both ends of the resistor 701 due to the voltage drop are applied through the resistors 302 and 303 to the positive (+) input terminal and the negative (−) input terminal of the current detecting amplifier 301, so that the latter 301 outputs the current feedback signal $I_F$.

Thus, in accordance with the pulse width modulation signal of the difference signal outputted by the PWM comparator 201, the clutch current flows in the electromagnetic clutch 502 to operate the latter. The electromagnetic clutch 502 is released by the clutch release signal provided by the microcomputer 101.

That is, the quick-break transistor 601 is normally held tuned on, and the release of the clutch is controlled by the clutch release signal. The clutch release signal is outputted by the microcomputer 101, and applied through the resistor 609 to the base of the signal converting transistor 607, to turn on the latter 607. As a result, the collector potential of the transistor 607 is decreased, so that the signal converting transistor 604 is turned off.

When the signal converting transistor 604 is turned off in this manner, the quick-break transistor 601 is turned off, thus interrupting the flow of the clutch current to the electromagnetic clutch 501. That is, the electromagnetic clutch 501 is released.

The conventional vehicle electromagnetic clutch control device is designed as described above. Therefore, in order to improve the resolution of the current instruction signal, it is necessary to increase the number of digital signal buffer amplifiers (803 through 808), the number of resistors forming the D/A conversion resistor circuit 801, and the number of output terminals of the microcomputer. For this purpose, it is necessary to increase the size of a substrate for mounting the device, which obstructs miniaturization of the device itself.

SUMMARY OF THE INVENTION

An object of this invention is to eliminate the above-described difficulties accompanying a conventional vehicle electromagnetic clutch control device. More specifically, an object of the invention is to provide a vehicle electro-magnetic clutch control device which can be miniaturized with its mounting substrate miniaturized.

The foregoing object of the invention has been achieved by the provision of a vehicle electromagnetic clutch control device which, according to the invention, comprises: a microcomputer which operates a current instruction signal according to engine control data and travel control data, to output a pulse width modulation signal; and a digital-to-analog converter for removing high frequency components from the pulse width modulation signal outputted by the microcomputer by using a PWM smoothing filter, to obtain a substantially DC current signal.

In the device of the invention, the microcomputer forms a current instruction signal according to engine control data and travel control data, and subjects the current instruction signal to pulse width modulation. In the digital-to-analog converter, the PWM smoothing filter operates to remove high frequency components from the pulse width modulation signal outputted by the microcomputer, to obtain the substantially DC current signal.

BRIEF DESCRIPTION OF THE DRAWINGS

FIGS. 2(a), 2(b) and 2(c) are signal waveform diagrams for a description of the operation of the control device according to the invention;

DETAILED DESCRIPTION OF THE PREFERRED EMBODIMENTS

Figure 1:
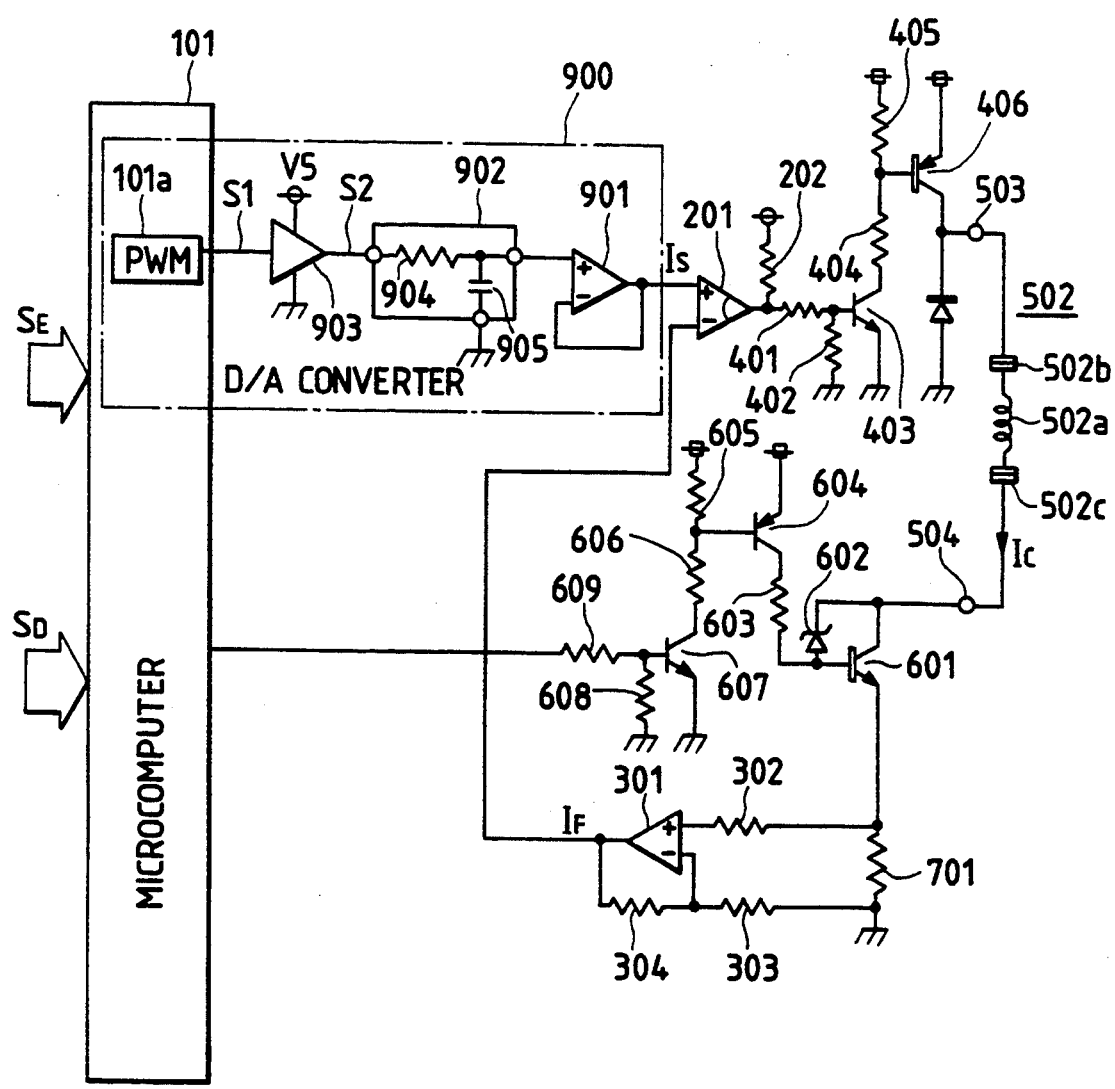
FIG. 1 is a circuit diagram showing the arrangement of an example of a vehicle electromagnetic clutch control device according to this invention.
Figure 3:
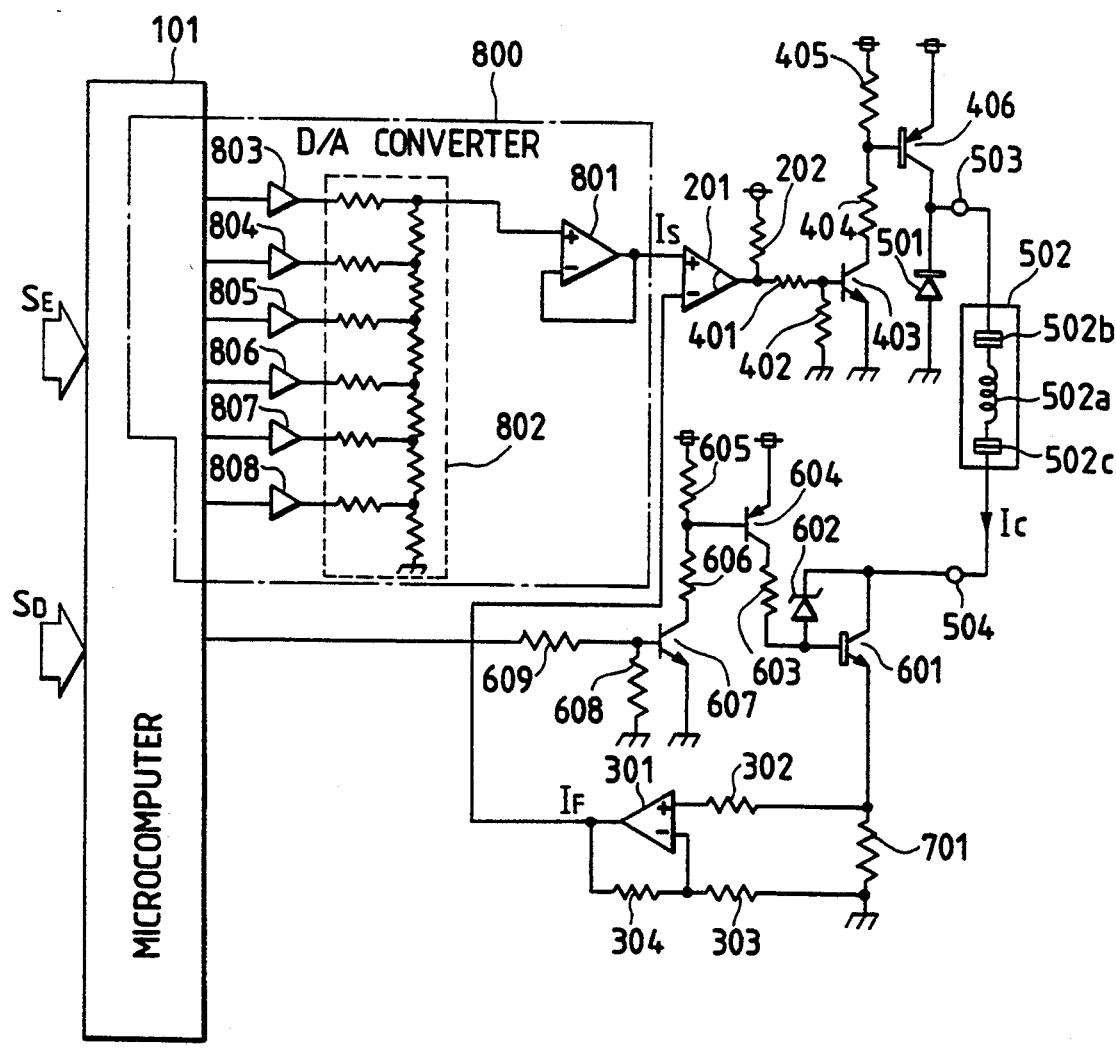
FIG. 3 is a circuit diagram showing the arrangement of a conventional vehicle electromagnetic clutch control device.

One example of a vehicle electromagnetic clutch control device according to this invention will be described with reference to the accompanying drawings. FIG. 1 is a circuit diagram showing the arrangement of the vehicle electromagnetic clutch control device according to the invention. In FIG. 1, parts corresponding functionally to those which have been described with reference to FIG. 3 are therefore designated by the same reference numerals or characters. Therefore, only parts different from those in FIG. 3 will now be described.

As is apparent from comparison of FIG. 1 with FIG. 3, the arrangement of a D/A converter 900 is different from that of the D/A converter 800 shown in FIG. 3. In the control device of the invention, the microcomputer 101 provides a current instruction signal according to engine control data $S_E$ and travel control data $S_D$. The current instruction signal is subjected to pulse width modulation by a PWM modulator 101a, which outputs a PWM modulation signal S1.

The PWM modulation signal S1 is applied through a digital signal buffer 903 in the D/A converter 900 to a PWM smoothing filter 902. The PWM smoothing filter 902 is a ladder-type filter comprising a resistor 904 and a capacitor 905. The PWM smoothing filter 902 removes high frequency components from the PWM modulation signal S1, to output a substantially DC current signal.

The output of the PWM smoothing filter 902 is applied to the positive (+) input terminal of an analog buffer amplifier 901, the negative (−) input terminal of which is connected to the output terminal thereof. The output of the analog buffer amplifier 901 is applied to the positive (+) input terminal of the PWM comparator 201. The other arrangements are equal to those of the conventional control device shown in FIG. 3.

Now, the operation of the vehicle electromagnetic clutch control device thus organized will be described. However, for simplification in description, description of the operations of the parts which are functionally equal to those in FIG. 3 will be omitted; that is, mainly the operation of the D/A converter 900, in which a specific feature of the invention resides, will be described.

The microcomputer 101 provides a current instruction signal according to engine control data $S_E$ and travel control data $S_D$. The current instruction signal is applied to the PWM modulator 101a, where it is subjected to pulse width modulation. As a result, the PWM modulator 101a outputs a PWM modulation signal S1.

The PWM modulation signal S1 has an H/L ratio proportional to the current instruction value as shown in FIG. 2(a). However, the output voltage is not ideal because of the internal drop voltage. In order to overcome this difficulty, the digital signal buffer amplifier 903 is employed to cause the output voltage to reach the ideal voltage as much as possible as shown in FIG. 2(b). Thus, the digital signal buffer amplifier 903 outputs a PWM signal S2.

The PWM signal S2 is applied to the PWM smoothing filter 902. The latter 902 is, in this case, an R-C filter comprising a resistor 904 and a capacitor 905. The PWM smoothing filter 902 operates to remove high frequency components from the PWM signal S1, thus outputting a DC current instruction signal $I_S$.

The instruction signal $I_S$ is amplified by the analog buffer amplifier 901 without being affected by the output load, similarly as in the case of the analog buffer amplifier 801 in the conventional control device. Thus, a substantially DC current signal as shown in FIG. 2(c) is obtained.

In the vehicle electromagnetic clutch control device of the invention, the microcomputer forms the current instruction signal according to engine control data and travel control data, and provides the PWM output signal, and the PWM output signal thus provided is applied to the PWM smoothing filter, to obtain the substantially DC current signal. Therefore, the control device can be simplified in circuit arrangement, and not only the substrate for mounting the control device but also the control device itself can be miniaturized.

What is claimed is:

1. A vehicle electromagnetic clutch control device comprising:
   a microcomputer having a PWM modulator for outputting a PWM modulation signal according to travel control data and engine control data, and for outputting a clutch release signal to release an electromagnetic clutch;
   a PWM smoothing filter for removing high frequency components from said PWM modulation signal to obtain a substantially DC current signal;
   a PWM comparator for comparing said substantially DC current signal with a current feedback signal to subject a difference signal therebetween to pulse width modulation and outputting a PWM difference signal;
   a PWM control output transistor which operates in response to said PWM difference signal, for causing a clutch current to flow in said electromagnetic clutch;
   a quick-break output transistor which is turned on at a time of connection of said electromagnetic clutch;
   an output current detecting resistor for detecting said clutch current flowing when said quick-break output transistor is turned on;
   a current detecting amplifier for amplifying a voltage across said output current detecting resistor to output said current feedback signal; and
   a signal converting transistor for rendering said quick-break output transistor nonconductive in response to said clutch release signal.

2. A vehicle electromagnetic clutch control device as claimed in claim 1, wherein said PWM smoothing filter comprises a resistor and a capacitor.

3. A vehicle electromagnetic clutch control device as claimed in claim 1, further comprising a digital signal buffer connected between said microcomputer and said PWM smoothing filter and an analog buffer amplifier connected between said PWM smoothing filter and said PWM comparator.

4. A vehicle electromagnetic clutch control device as claimed in claim 3, wherein said PWM modulator in said microcomputer, said digital signal buffer, said PWM smoothing filter and said analog buffer amplifier constitute a D/A converter for converting said PWM modulation signal into said substantially DC current signal.

* * * * *